No. 813,674. PATENTED FEB. 27, 1906.
J. F. SKIRROW.
CLAMPING SLEEVE FOR PNEUMATIC DESPATCH TUBES.
APPLICATION FILED JUNE 24, 1905.

Witnesses:
Emily D. Caughlan
Emma Kaufmann

Inventor:
John F. Skirrow
by Davis & Davis
his Attys.

UNITED STATES PATENT OFFICE.

JOHN F. SKIRROW, OF EAST ORANGE, NEW JERSEY.

CLAMPING-SLEEVE FOR PNEUMATIC-DESPATCH TUBES.

No. 813,674.      Specification of Letters Patent.      Patented Feb. 27, 1906.

Application filed June 24, 1905. Serial No. 266,721.

*To all whom it may concern:*

Be it known that I, JOHN F. SKIRROW, a citizen of the United States, residing in East Orange, county of Essex, and State of New Jersey, have invented certain new and useful Improvements in Clamping-Sleeves for Pneumatic-Despatch Tubes, of which the following is a specification, reference being had therein to the accompanying drawings, in which—

Figure 1:
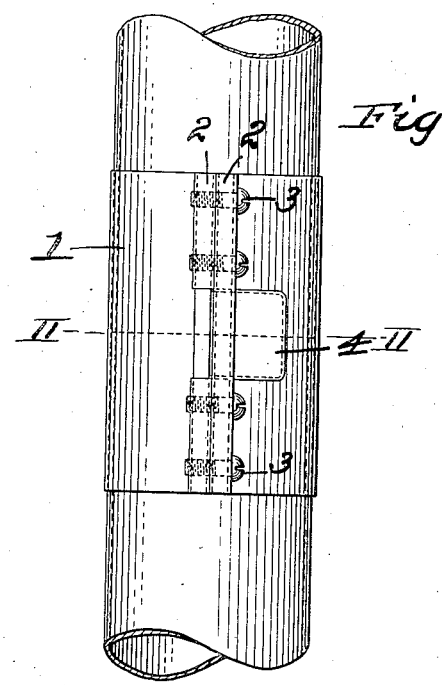
Figure 2:
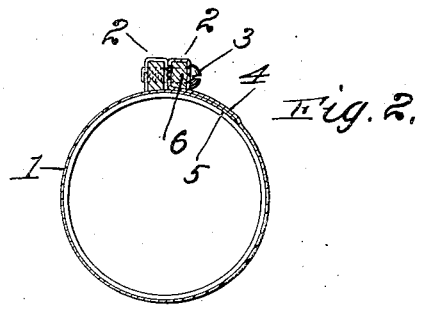
Figure 4:
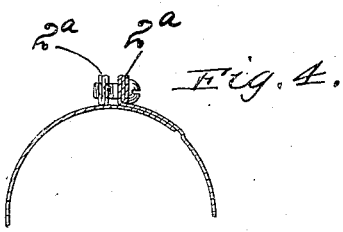
Figure 3:
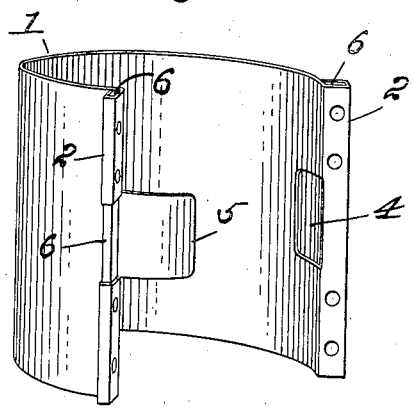

Figure 1 is a side elevation of the sleeve in position; Fig. 2, a horizontal sectional view on the line II II of Fig. 1; Fig. 3, a perspective view of the clamping-sleeve detached, and Fig. 4 a detail view of a slightly-different form of the device.

In installing pneumatic-despatch-tube apparatus it is difficult to join the abutting ends of two sections of the transfer-tube smoothly and to form an air-tight closure between them. It has been the practice to use clamping-sleeves to bridge the joint between the abutting ends of the two sections of the tube and to hold said sleeves in position by means of ring-clamps at the ends thereof. In addition to this in order to make the joint air-tight the interior of the sleeve and the exterior of the tubes have been covered with shellac varnish, so that when said varnish is dry the sleeve is cemented or "frozen" in position. It will be readily seen that this operation is tedious and the device bulky and unsightly. It is, furthermore, evident that such a joint is extremely difficult to take down without injuring the tubes and the clamping-sleeves.

It is the object of this invention to provide a sleeve which may be readily secured in position to bridge the joint between the abutting ends of two sections of the transfer-tube to form an air-tight closure and which at the same time may be readily removed whenever it may be desired to separate the tube-sections.

Referring to the various parts by numerals, 1 designates the sheet-metal clamping-sleeve, which is split and normally springs open, as shown in Fig. 3, in order that it may be readily placed about the transfer-tube. Along the longitudinal edges of the split sleeve are formed the radial bars or flanges 2, which are adapted to be brought together when the sleeve is in position about the tube. These flanges or bars are threaded to receive clamping-screws 3, by means of which the two longitudinal edges of the sleeve are brought close together and the sleeve thus clamped about the transfer-tube in position to bridge the joint between the abutting sections thereof. The clamping-sleeve on its inner side and near one of its longitudinal edges is formed with a recess or socket 4. The opposite edge of the sleeve is formed with an outward-projecting integral tongue 5, which when the longitudinal edges of the sleeve are drawn together by means of the bolts fits snugly in said socket. The tongue is curved to correspond to the curvature of the sleeve, and the socket is of a depth equal to the thickness of the tongue, so that when said tongue is in position therein the interior surface of the sleeve will be smooth and practically continuous, so that it may be caused to fit closely about the tube. In placing the sleeve on the tube-sections the tongue is placed at the joint, so that when the sleeve is firmly clamped in position said tongue will bridge the joint or space between the two flanges of the sleeve, and thereby complete the annular air-retaining closure. It will of course be seen that if the tongue were omitted there would be an unprotected point where the air could escape from the despatch-tube out through the joint between the two edges of the sleeve. As shown in the drawings, the sleeve is formed from one piece of resilient sheet metal, preferably brass, the tongue being formed integral therewith. The sleeve-forming sheet is bent around the longitudinal stiffening-bars 6, and the edges of said sheet are secured to the outer surface of the body of said material, so that the stiffening-bars are inclosed thereby. It will of course be understood that if it be desired the stiffening-bars may be dispensed with and several folds of the material be made along the longitudinal edges of the sleeve to stiffen the same and to form a body of material through which to form the screw-threaded openings for the clamping-screws, as shown at 2ª in Fig. 4.

It will be readily seen that the clamping-sleeve of this construction may be readily secured about the abutting ends of two sections of a pneumatic-despatch tube and that when in position it will form a complete air-tight closure therefor. It will be further seen that whenever desired the sleeve may be quickly detached from the tube. Even should it be found desirable to use shellac varnish to aid in forming the air-tight joint said varnish would not interfere with the removing of the sleeve, for the reason that said sleeve would tend to spring open as soon as the clamp-screws are removed therefrom.

Having described my invention, what I claim as new, and desire to secure by Letters Patent, is—

1. A clamping-sleeve for pneumatic-despatch tubes comprising a broad sheet of thin flexible material adapted to be bent around a tube and provided at its longitudinal edges with outward-extending clamping-bars, a broad tongue formed on one longitudinal edge of said sleeve midway the ends thereof, a tongue-receiving socket being formed in the inner surface of said sleeve at the other longitudinal edge thereof and adapted to receive said tongue, whereby said tongue will bridge the joint between the longitudinal edges of the sleeve, and broad bearing and clamping surfaces will be provided on each side of the tongue and socket, and clamping-screws threaded through the clamping-bars on each side of the socket and tongue, said screws being adapted to draw together the longitudinal edges of the sleeve.

2. A clamping-sleeve for pneumatic tubes consisting of a longitudinally-split sleeve of thin resilient material adapted to be folded about the said tubes, the longitudinal edges of said sleeve being folded around longitudinal bars to form stiff clamping members, means secured to said clamping members to draw the two edges of the sleeve together, an outward-extending tongue or bridge-piece formed on one longitudinal edge of the sleeve, a socket being formed in the other edge of said sleeve on the inner side thereof to receive said tongue or bridge-piece when the two clamping members are drawn together.

In testimony whereof I hereunto affix my signature, in the presence of two witnesses, this 21st day of June, 1905.

JOHN F. SKIRROW.

Witnesses:
   JNO. T. NEEDHAM,
   THOS. L. CARPENTER.